(No Model.)
A. BECKER.
ANIMAL TRAP.
No. 372,292. Patented Nov. 1, 1887.
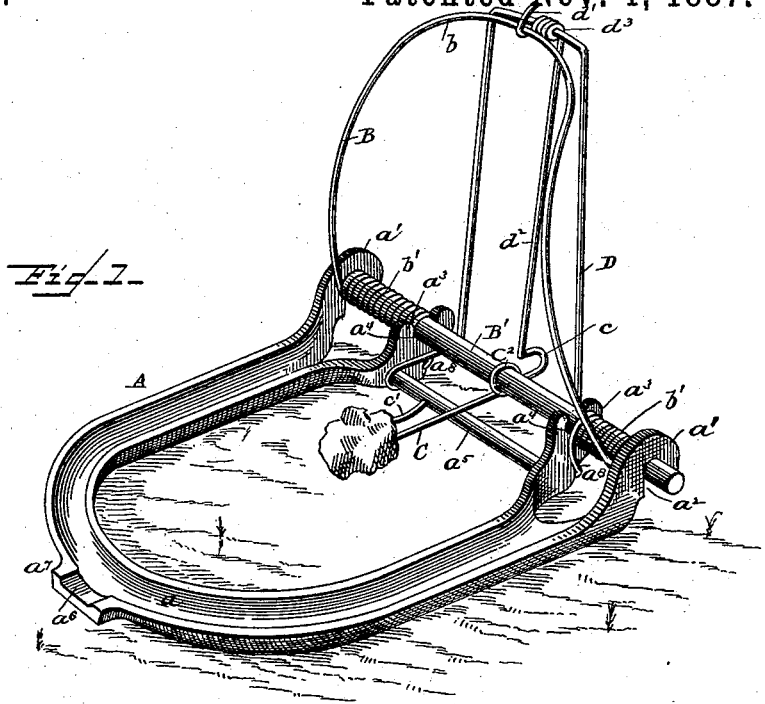
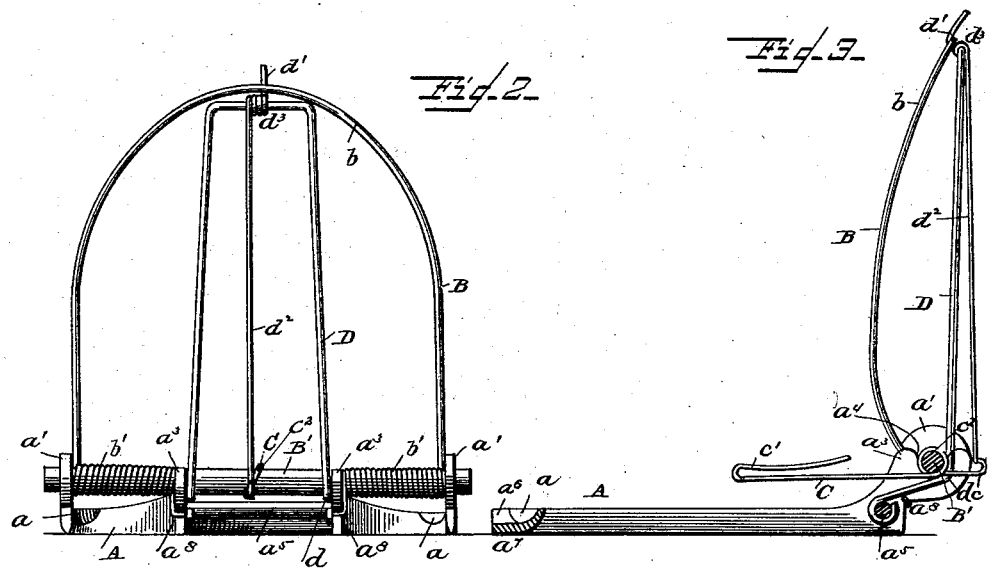
WITNESSES
Edwin L. Yewell,
Wm. J. Littell,
INVENTOR
Alphons Becker,
by J. R. Littell,
Attorney

UNITED STATES PATENT OFFICE.

ALPHONZO BECKER, OF WATERFORD, PENNSYLVANIA, ASSIGNOR OF ONE-HALF TO PERRY E. WILCOX, OF GENEVA, OHIO.

ANIMAL-TRAP.

SPECIFICATION forming part of Letters Patent No. 372,292, dated November 1, 1887.

Application filed March 21, 1887. Serial No. 231,742. (No model.)

*To all whom it may concern:*

Be it known that I, ALPHONZO BECKER, a citizen of the United States, residing at Waterford, in the county of Erie and State of Pennsylvania, have invented certain new and useful Improvements in Animal-Traps, of which the following is a specification.

This invention relates to animal-traps; and its object is to provide an improved trap of this class which shall possess advantages in point of simplicity of construction, inexpensiveness, and general efficiency, and one which can be folded compactly when not in use, so as to occupy but a minimum amount of space.

In the drawings, Figure 1 is a perspective view showing the trap set for use. Fig. 2 is a transverse vertical section. Fig. 3 is a longitudinal vertical section.

Corresponding parts in the figures are denoted by the same letters of reference.

Referring to the drawings, A designates an approximately U-shaped base portion, which is provided with a corresponding longitudinal groove, $a$, in its upper face. The base portion is provided at its ends with arms or extensions, the outer of which, $a'$ $a'$, are provided with slots or recesses $a^2$ $a^2$ in their under edge, while the corresponding inner arms, $a^3$ $a^3$, have corresponding recesses or slots, $a^4$ $a^4$, in their upper edge. A transverse rod or bar, $a^5$, connects and braces the inner arms or extensions, $a^3$.

B designates a curved spring-arm having a main portion, $b$, corresponding to and normally fitting in the groove $a$ of the base-plate, and formed with coil-springs $b'$ $b'$ near its ends. These coiled portions set between the arms $a^2$ and $a^3$, and have bearings upon a transverse rod or bar, B', fitting in the slots in the arms $a^2$ and $a^3$. The ends of the spring-wire are bent under a shoulder, $a^3$, in the under edge of the arms $a^3$, as shown, to retain the spring-arm in position. Loosely mounted upon the bar B', between the arms $a^3$, by means of a central loop, $c^2$, is a trigger, C, having a curved rear end, $c$, and formed with a hook, $c'$, at its inner end for holding the bait.

D designates an approximately U-shaped wire arm or bail having bearings at its ends upon the bar $a^5$ and bent near its bearings at right angles to the main portion, as shown at $d'$. Upon the said arm at its top is loosely mounted, by means of a coil, $d^3$, a lever having a hook-shaped front end, $d'$, and a long arm, $d^2$, extending downward and adapted to engage the end $c$ of the trigger when the trap is set. A groove, $a^6$, is provided in an extension, $a^7$, at the front edge of the base-plate to facilitate the raising of the spring-arm B.

In operation the spring-arm B is first raised and the arm $d^2$ elevated until the spring B can be passed over the hook $d'$. The arm $d^2$ is then lowered and its end placed in engagement with the end $c$ of the trigger. It will be readily seen that any movement of the bait upon the trigger will release the latter from engagement with the lever, and the spring B will instantly return to its normal position.

When the trap is not in use, or when packed for shipping, the arm D can be folded under the trap, thus occupying but little space.

I claim as my invention—

1. The combination, in an animal-trap, of a base portion provided at its ends with outer arms, $a'$, having recesses in their under edge, and with inner arms, $a^3$, having recesses in their upper edge, a transverse bar extending across the rear end of the base and seated in said recesses, a curved spring-arm mounted upon said bar by means of coils and retained between the respective arms $a'$ and $a^3$, and trip mechanism, substantially as set forth.

2. The combination, in an animal-trap, of an approximately U-shaped base portion provided with a longitudinal groove in its upper face, and with inner and outer arms, $a'$ $a^3$, at its ends, a transverse bar mounted in said arms, a curved spring-arm corresponding to said groove and normally received within the same, said arm having bearings upon the bar between the respective arms $a'$ and $a^3$, and trip mechanism, substantially as set forth.

3. An animal-trap comprising a base portion having arms at its ends, a transverse bar mounted in said arms, a rod, $a^5$, connecting the arms $a^3$, and an approximately U-shaped arm or bail, D, having end bearings upon the rod $a^5$, and formed with an angle bearing against the transverse bar, whereby the bail may be folded under the trap, substantially as set forth.

4. The combination, in an animal-trap, of a base portion having inner and outer arms, $a'$ $a^3$, at its ends, a transverse bar mounted upon said arms, a spring-arm having coils mounted upon said bar between the respective arms $a'$ and $a^3$, an upright bail, D, connected with the base portion and bearing against the transverse bar, a trigger mounted and bearing upon said bar, and an arm, $d^2$, for engaging the trigger, substantially as set forth.

5. The combination, in an animal-trap, of an approximately U-shaped base portion provided at its ends with outer arms, $a'$, having recesses in their under edge, and with inner arms, $a^3$, having recesses in their upper edge, a transverse bar seated in said recesses, a curved spring-arm having coils mounted upon said bar between the respective arms $a'$ $a^3$, a rod connecting the inner arms, $a^3$ $a^3$, a bail, D, having end bearings upon said rod and formed with an angle bearing against the transverse bar, a trigger mounted and bearing upon said bar, and an arm having a hook-shaped end for engaging the curved spring-arm, substantially as set forth.

In testimony whereof I affix my signature in presence of two witnesses.

ALPHONZO BECKER.

Witnesses:
P. W. PECK,
THOS. A. HUNTER.